United States Patent
Bryc et al.

(10) Patent No.: US 8,799,814 B1
(45) Date of Patent: Aug. 5, 2014

(54) AUTOMATED TARGETING OF CONTENT COMPONENTS

(75) Inventors: Michal M. Bryc, Seattle, WA (US); Daniel B. Lloyd, Mercer Island, WA (US); Llewllyn J. Mason, Seattle, WA (US); Samuel A. Minter, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 539 days.

(21) Appl. No.: 12/035,618

(22) Filed: Feb. 22, 2008

(51) Int. Cl.
*G06F 3/048* (2013.01)

(52) U.S. Cl.
USPC ............. 715/811; 715/812; 705/14; 705/26.8

(58) Field of Classification Search
CPC ................................ G06Q 30/00; G06Q 30/02
USPC ......... 715/764, 779, 736, 730, 732, 733, 738, 715/744, 745, 746, 788, 789; 703/3; 705/1, 705/25
See application file for complete search history.

(56) References Cited

U.S. PATENT DOCUMENTS

| | | | |
|---|---|---|---|
| 5,890,137 A | 3/1999 | Koreeda | |
| 5,953,710 A | 9/1999 | Fleming | |
| 6,332,131 B1 | 12/2001 | Grandcolas et al. | |
| 6,636,242 B2* | 10/2003 | Bowman-Amuah | 715/764 |
| 6,658,568 B1 | 12/2003 | Ginter et al. | |
| 6,661,431 B1* | 12/2003 | Stuart et al. | 715/733 |
| 6,853,987 B1 | 2/2005 | Cook | |
| 6,868,395 B1 | 3/2005 | Szlam et al. | |
| 6,980,960 B2 | 12/2005 | Hajdukiewicz et al. | |
| 6,988,657 B1 | 1/2006 | Singer et al. | |
| 7,058,718 B2 | 6/2006 | Fontes et al. | |
| 7,073,129 B1* | 7/2006 | Robarts et al. | 715/740 |
| 7,089,497 B2* | 8/2006 | Abbott et al. | 715/740 |
| 7,107,226 B1 | 9/2006 | Cassidy et al. | |
| 7,117,165 B1 | 10/2006 | Adams et al. | |
| 7,136,841 B2 | 11/2006 | Cook | |
| 7,185,010 B2 | 2/2007 | Morinville | |
| 7,225,156 B2 | 5/2007 | Fisher et al. | |
| 7,319,986 B2 | 1/2008 | Praisner et al. | |
| 7,324,968 B2 | 1/2008 | Rotman et al. | |
| 7,379,921 B1 | 5/2008 | Kiliccote | |
| 7,383,231 B2 | 6/2008 | Gupta et al. | |
| 7,434,723 B1 | 10/2008 | White et al. | |
| 7,478,331 B2* | 1/2009 | Abbott et al. | 715/740 |
| 7,496,849 B2* | 2/2009 | Abbott et al. | 715/744 |
| 7,552,365 B1* | 6/2009 | Marsh et al. | 714/47.2 |

(Continued)

OTHER PUBLICATIONS

"PayPal Security Key", retrieved on Jun. 19, 2008 at <<https://www.paypal.com/securitykey>>, PayPal (2 pages).

(Continued)

*Primary Examiner* — William Titcomb
(74) *Attorney, Agent, or Firm* — Lee & Hayes, PLLC

(57) ABSTRACT

Techniques for automated targeting of content components to users are described. Content components are selected and exposed through renderable pages for viewing by a population of users. User activity following exposure is tracked in an effort to identify which types of users (as characterized by certain attributes) are likely to act on the content components. The users are segmented into groups according to the attributes and the segments are fed back to aid in selection of content components to be exposed to the users. This enables more granular targeting of the content components to those users who exhibit the attributes that define the specific groups.

20 Claims, 6 Drawing Sheets

(56) References Cited

U.S. PATENT DOCUMENTS

| | | | |
|---|---|---|---|
| 7,676,407 B2 | 3/2010 | Van De Van et al. |
| 7,685,013 B2 | 3/2010 | Gendler |
| 7,729,994 B2 | 6/2010 | Gupta et al. |
| 7,748,614 B2 | 7/2010 | Brown |
| 7,809,819 B2 | 10/2010 | DeLima et al. |
| 7,917,160 B2 | 3/2011 | Choe et al. |
| 8,027,918 B2 | 9/2011 | Nielsen et al. |
| 8,046,256 B2 | 10/2011 | Chien et al. |
| 8,150,768 B2 | 4/2012 | Gupta et al. |
| 8,249,988 B2 | 8/2012 | Teicher |
| 8,271,395 B2 | 9/2012 | Dominguez et al. |
| 2001/0034724 A1 | 10/2001 | Thieme |
| 2001/0044756 A1 | 11/2001 | Watkins et al. |
| 2002/0046169 A1 | 4/2002 | Keresman, III et al. |
| 2002/0087477 A1 | 7/2002 | Mantena et al. |
| 2002/0103752 A1 | 8/2002 | Berger et al. |
| 2002/0112171 A1 | 8/2002 | Ginter et al. |
| 2002/0120567 A1 | 8/2002 | Caplan et al. |
| 2002/0174030 A1 | 11/2002 | Praisner et al. |
| 2002/0194138 A1 | 12/2002 | Dominguez et al. |
| 2003/0004831 A1 | 1/2003 | Owens |
| 2003/0046172 A1 | 3/2003 | Himmel et al. |
| 2003/0061170 A1 | 3/2003 | Uzo |
| 2003/0083983 A1 | 5/2003 | Fisher et al. |
| 2003/0105682 A1* | 6/2003 | Dicker et al. ............... 705/27 |
| 2003/0126094 A1 | 7/2003 | Fisher et al. |
| 2003/0135625 A1 | 7/2003 | Fontes et al. |
| 2003/0139971 A1 | 7/2003 | Rescigno et al. |
| 2003/0220875 A1 | 11/2003 | Lam et al. |
| 2004/0111370 A1 | 6/2004 | Saylors et al. |
| 2004/0128211 A1 | 7/2004 | Tsai |
| 2004/0143547 A1 | 7/2004 | Mersky |
| 2004/0198308 A1 | 10/2004 | Hurst et al. |
| 2004/0225606 A1 | 11/2004 | Nguyen et al. |
| 2004/0267672 A1 | 12/2004 | Gray et al. |
| 2005/0027639 A1 | 2/2005 | Wong |
| 2005/0097037 A1 | 5/2005 | Tibor |
| 2005/0108153 A1 | 5/2005 | Thomas et al. |
| 2005/0125317 A1 | 6/2005 | Winkelman, III et al. |
| 2005/0149439 A1 | 7/2005 | Suisa |
| 2005/0154744 A1 | 7/2005 | Morinville |
| 2005/0166265 A1 | 7/2005 | Satomi |
| 2005/0167489 A1 | 8/2005 | Barton et al. |
| 2005/0198534 A1 | 9/2005 | Matta et al. |
| 2005/0240493 A1 | 10/2005 | Johnson et al. |
| 2005/0278222 A1 | 12/2005 | Nortrup |
| 2005/0278263 A1 | 12/2005 | Hollander et al. |
| 2006/0015458 A1 | 1/2006 | Teicher |
| 2006/0015463 A1 | 1/2006 | Gupta et al. |
| 2006/0080238 A1 | 4/2006 | Nielsen et al. |
| 2006/0136309 A1 | 6/2006 | Horn et al. |
| 2006/0212392 A1 | 9/2006 | Brown |
| 2006/0212393 A1 | 9/2006 | Lindsay Brown |
| 2006/0219776 A1 | 10/2006 | Finn |
| 2006/0248452 A1* | 11/2006 | Lambert et al. ............ 715/513 |
| 2006/0265489 A1* | 11/2006 | Moore ........................ 709/223 |
| 2006/0277474 A1* | 12/2006 | Robarts et al. ............. 715/745 |
| 2007/0005495 A1 | 1/2007 | Kim |
| 2007/0073630 A1 | 3/2007 | Greene et al. |
| 2007/0078760 A1 | 4/2007 | Conaty et al. |
| 2007/0083433 A1 | 4/2007 | Lawe |
| 2007/0106606 A1 | 5/2007 | Pankratz et al. |
| 2007/0150299 A1 | 6/2007 | Flory |
| 2007/0157110 A1* | 7/2007 | Gandhi et al. ............. 715/779 |
| 2007/0179790 A1 | 8/2007 | Leitch et al. |
| 2007/0192245 A1 | 8/2007 | Fisher et al. |
| 2007/0198432 A1 | 8/2007 | Pitroda et al. |
| 2007/0226084 A1 | 9/2007 | Cowles |
| 2007/0283273 A1* | 12/2007 | Woods ........................ 715/738 |
| 2007/0288364 A1 | 12/2007 | Gendler |
| 2007/0288370 A1 | 12/2007 | Konja |
| 2007/0299736 A1 | 12/2007 | Perrochon et al. |
| 2008/0015927 A1 | 1/2008 | Ramirez |
| 2008/0033878 A1 | 2/2008 | Krikorian et al. |
| 2008/0052226 A1 | 2/2008 | Agarwal et al. |
| 2008/0052343 A1* | 2/2008 | Wood ........................ 709/202 |
| 2008/0097933 A1 | 4/2008 | Awaida et al. |
| 2008/0114709 A1* | 5/2008 | Dixon et al. ............... 706/13 |
| 2008/0134043 A1* | 6/2008 | Georgis et al. ............. 715/733 |
| 2008/0140524 A1* | 6/2008 | Anand et al. ............... 705/14 |
| 2008/0140564 A1 | 6/2008 | Tal et al. |
| 2008/0147506 A1 | 6/2008 | Ling |
| 2008/0168543 A1 | 7/2008 | von Krogh |
| 2008/0168544 A1 | 7/2008 | von Krogh |
| 2008/0177663 A1 | 7/2008 | Gupta et al. |
| 2008/0183574 A1* | 7/2008 | Nash et al. ................ 705/14 |
| 2008/0183757 A1* | 7/2008 | Dorogusker et al. ...... 707/104.1 |
| 2008/0189186 A1 | 8/2008 | Choi et al. |
| 2008/0195506 A1 | 8/2008 | Koretz et al. |
| 2008/0201643 A1* | 8/2008 | Nagaitis et al. ............ 715/738 |
| 2008/0208747 A1 | 8/2008 | Papismedov et al. |
| 2008/0221987 A1* | 9/2008 | Sundaresan et al. ........ 705/14 |
| 2008/0270293 A1 | 10/2008 | Fortune et al. |
| 2008/0275777 A1* | 11/2008 | Protheroe et al. .......... 705/14 |
| 2008/0320147 A1 | 12/2008 | DeLima et al. |
| 2009/0006995 A1* | 1/2009 | Error et al. ................. 715/764 |
| 2009/0024469 A1* | 1/2009 | Broder et al. .............. 705/14 |
| 2009/0037294 A1 | 2/2009 | Malhotra |
| 2009/0132969 A1* | 5/2009 | Mayer ........................ 715/862 |
| 2009/0138379 A1 | 5/2009 | Scheman |
| 2009/0164442 A1* | 6/2009 | Shani et al. ................. 707/5 |
| 2009/0172551 A1* | 7/2009 | Kane et al. .................. 715/733 |
| 2009/0248467 A1 | 10/2009 | Bulman et al. |
| 2009/0259559 A1 | 10/2009 | Carroll et al. |
| 2009/0259574 A1 | 10/2009 | Thomsen et al. |
| 2009/0307134 A1 | 12/2009 | Gupta et al. |
| 2010/0049766 A1* | 2/2010 | Sweeney et al. ............ 707/737 |
| 2010/0121734 A1 | 5/2010 | Harper et al. |
| 2010/0197380 A1 | 8/2010 | Shackleton |
| 2010/0293048 A1* | 11/2010 | Singolda et al. ........... 705/14.43 |
| 2010/0299731 A1 | 11/2010 | Atkinson |
| 2010/0306078 A1 | 12/2010 | Hwang |
| 2011/0035289 A1* | 2/2011 | King et al. ................. 705/14.73 |
| 2011/0060629 A1 | 3/2011 | Yoder et al. |
| 2011/0117935 A1 | 5/2011 | Cho et al. |
| 2013/0074168 A1 | 3/2013 | Hao et al. |
| 2013/0136242 A1 | 5/2013 | Ross et al. |

OTHER PUBLICATIONS

Quova, retrieved on May 29, 2009 at <<http://www.quova.com/>>, Quova Inc., USA, 5 pgs.

Kessler, "Passwords—Streghts and Weaknesses", retrived at <<http://www.garykessler.net/library/password.html>>, 1996, pp. 1-pp. 7.

Office action for U.S. Appl. No. 12/165,102, mailed on Apr. 1, 2011, Jesensky, James, "Automatic Approval".

Non-Final Office Action for U.S. Appl. No. 12/147,876, mailed on May 6, 2011, Isaac Oates, "Providing Information Without Authentication".

Non-Final Office Action for U.S. Appl. No. 12/165,102, mailed on Mar. 8, 2012, James Jesensky et al., "Automatic Approval", 31 pages.

Non-Final Office Action for U.S. Appl. No. 12/165,081, mailed on Jun. 4, 2012, Amit Agarwal et al., "Conducting Transactions with Dynamic Passwords", 23 pages.

Non-Final Office Action for U.S. Appl. No. 12/165,102, mailed on Jul. 3, 2012, Jesensky James et al., "Automatic Approval", 30 pages.

Apache HBase, Chapter 8 Architecture, retrieved from <<http://hbase.apache.org/book.html#architecture>>, available as early as Nov. 30, 2011, Apache Software Foundation, 8 pages.

Chang et al, "Bigtable: A Distributed Storage System for Structured Data," 7th USENIX Symposium on Operating Systems Design and Implementation, OSDI '06, Nov. 2006, 14 pages.

Final Office Action for U.S. Appl. No. 12/147,876, mailed on May 6, 2011, Isaac Oates et al., "Providing Information Without Authentication", 11 pages.

Fielding et al, "Hypertext Transfer Protocol—HTTP/1.1", Network Working Group, W3C/MIT, Jun. 1999, http://tools.ietf.org/pdf/rfc2616.pdf, 114 pages.

Howstuffworks, "What is a packet?", http//web.archive.org/web/20060708154355/http://computer.howstuffworks.com/question525.htm, last retrieved Sep. 1, 2011, 2 pages.

(56) References Cited

OTHER PUBLICATIONS

Final Office Action for U.S. Appl. No. 12/035,618, mailed on Aug. 2, 2011, Michal Bryc, "Automated Targeting of Content Components".

Final Office Action for U.S. Appl. No. 12/165,102, mailed on Sep. 13, 2011, James Jesensky, "Automatic Approval", 31 pages.

Wikipedia, HTTP cookie, "http://web.archive.org/web/20080227064831/http://en.wikipedia.org/wiki/HTTP_cookie", last retrieved Sep. 1, 2011, 18 pages.

Wikipedia, MSISDN, http://web/archive.org/web/20071029015418/http://en.wikipeida.org/wiki/MSISDN, last retrieved Sep. 1, 2011, 3 pages.

Office action for U.S. Appl. No. 12/165,102, mailed on May 17, 2013, Jesensky et al, "Automatic Approval", 42 pages.

Final Office Action for U.S. Appl. No. 12/165,102, mailed on Nov. 8, 2013, James Jesensky, "Automatic Approval", 37 pages.

Office Action for U.S. Appl. No. 12/165,081, mailed on Nov. 20, 2013, Amit Agarwal, "Conducting Transactions with Dynamic Passwords", 25 pages.

Office action for U.S. Appl. No. 12/165,081, mailed on Oct. 17, 2012, Agarwal et al., "Conducting Transactions with Dynamic Passwords", 25 pages.

Office action for U.S. Appl. No. 12/165,102, mailed on Nov. 9, 2012, Jesensky et al., "Automatic Approval", 36 pages.

U.S. Appl. No. 11/771,679, filed Jun. 29, 2007, Maynard-Zhang, et al., "Mapping Attributes to Network Addresses.", 28 pages.

* cited by examiner

AUTOMATED TARGETING OF CONTENT COMPONENTS

BACKGROUND

With a vast and growing population of people going online to shop, read news, search for information, seek entertainment, check weather and traffic, transact business, and so forth, there are myriad opportunities and contexts within which providers can interact with people in meaningful ways. Each time a person visits a website and views a page provides another opportunity to offer information tailored to that person, such as targeted advertisements, specialty articles, recommendations, and so forth. However, there is limited viewable space on a page and the amount of space varies depending upon the computing device used to render the page. Getting the right information to the right audience in a timely manner presents an ongoing challenge.

There have been various approaches to selecting what content gets put on a page and where that content is placed. Manual placement is widely used, where site operators decide which items are placed in prescribed locations on the page. Ranking schemes have also been used to order lists of items or rank search results, so that items of more relevance are prioritized over items of less relevance. In the context of online advertising, auction algorithms have also been employed to allow advertisers to compete for locations on the page.

Once selection and placement decisions are made and the content is served, it is difficult to know whether the content presented was optimal for any given user. For instance, suppose a site operator is building a page that contains an article on mountaineering and the page has slots available for advertisements. Common sense might dictate that the most appropriate advertisements would pertain to mountaineering, such as climbing gear or vacation packages to destination mountain resorts. However, if the content appeals more generally to young adults interested in outdoor activities, many of whom are parents of small children, perhaps an advertisement for children's clothing would be more successful in driving sale activity than the vacation advertisement.

Accordingly, there remains a need for improved selection and placement of content that is tailored to individual users.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed to automated targeting of content to users. The content may be essentially any type of data or information that can be served electronically, such as news, search results, weather, articles, entertainment, financial data, traffic status, advertisements, recommendations, images, photographs, video, e-commerce items, and so on. The content is provided in manageable chunks or components. When a user visits a site, content components are selected and placed on a page, which is then served to users for viewing. User interaction with the content components on the page is observed to identify which types of users (as characterized by certain attributes) are likely to act on the content components. The users are segmented into groups according to the attributes and this information is fed back to aid in selection and placement of content components. In this manner, more granular targeting of content components may be achieved.

The automated targeting may be implemented in a number of ways. One example implementation is provided with reference to the following figures, as described below in more detail.

Example Environment and System Architecture

Figure 1:
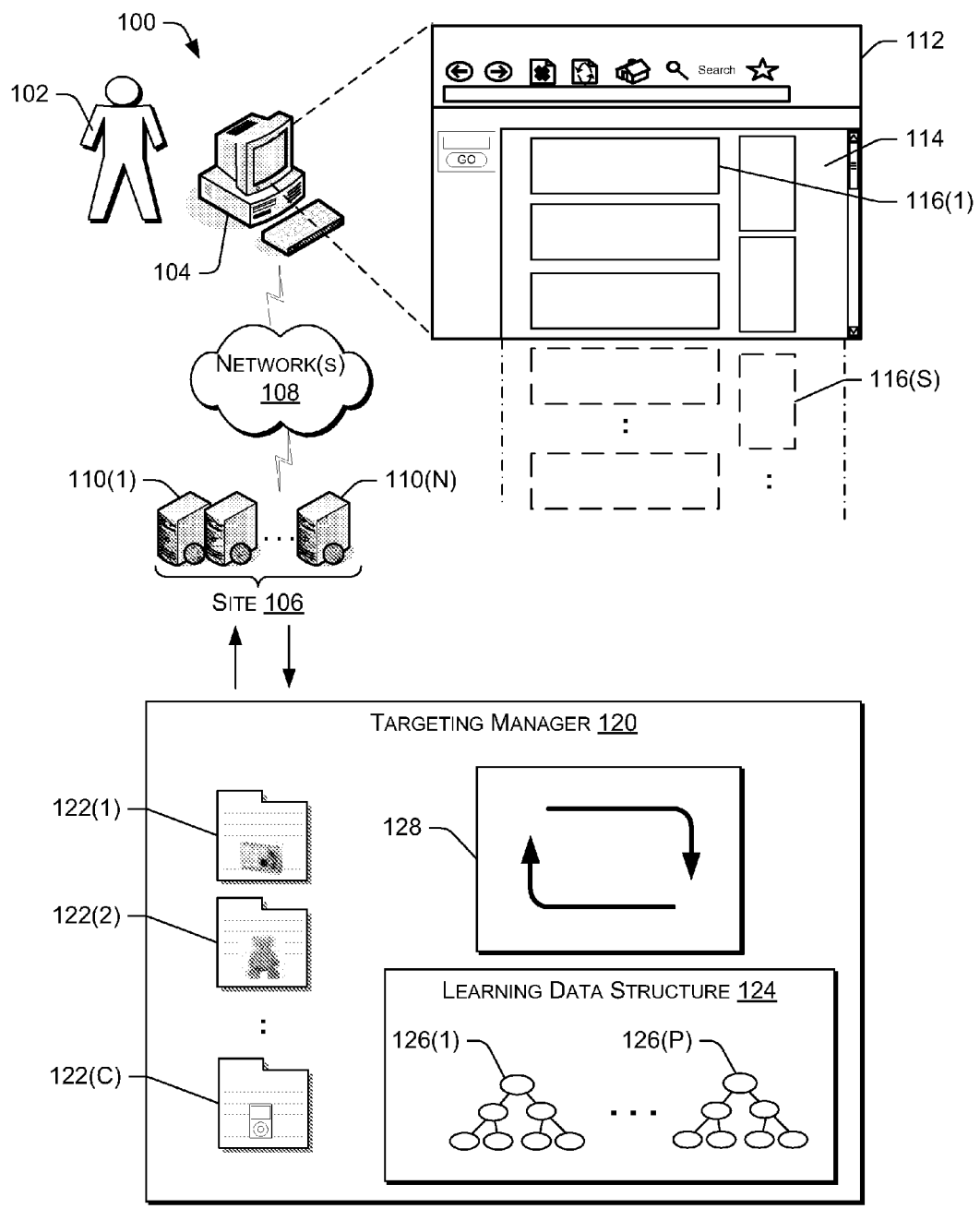
FIG. 1 illustrates an example architecture for automated targeting of content components to users. The architecture includes a client device coupled via a network to one or more computing sites and a targeting manager that aids in the targeting of content to users.

FIG. 1 illustrates an example architecture 100 in which automated targeting of content may be implemented. In architecture 100, a representative user 102 employs a user computing device 104 to access a representative content site 106 via a network 108. The network 108 is representative of any one or combination of multiple different types of networks, such as cable networks, the Internet, and wireless networks.

The user computing device 104 may be implemented as any number of computing devices, including as a personal computer, a laptop computer, a portable digital assistant (PDA), a cell phone, a set-top box, a game console, and so forth. Each user computing device 104 is equipped with one or more processors and memory to store applications and data. An application, such as browser, running on the device 104 facilitates access to the site 106 over the network 108.

The content site 106 is hosted on one or more servers 110(1), . . . , 110(N) having processing and storage capabilities. In one implementation, the servers might be arranged in a cluster or as a server farm, although other server architectures may also be used to host the site. The site is capable of handling requests from many users and serving, in response, various pages of content that can be rendered at the user computing device 104 for viewing by the user 102. The content site 106 is representative of any number of sites, such as websites for e-commerce, news and information, search, entertainment, and so forth. Additionally, the site is representative of proprietary sites that receive requests and provide content over proprietary networks other than the Internet and public web.

In the illustrated example, the site 106 serves content as pages that can be rendered by a browser application running on the user computing device 104. A browser user interface (UI) 112 presents a page 114 having multiple slots 116(1), . . . , 116(S) designated to hold various forms of content. There may be any number of slots. In this illustration, there are horizontal slots, such as slot 116(1), and vertical slots, such as slot 116(S). As one example, the horizontal slots may hold articles or search results lists, and the vertical slots may be used for advertisements, images, or links to other relevant information. It is noted that the illustrated arrangement of horizontal and vertical slots is just one example. More generally, content may be arranged in any number of layouts and formats.

Depending upon various factors (e.g., page design, display size, type of content, bandwidth, etc.), there may be instances where not all slots are viewable at one time. For instance, when the page is initially rendered, a subset of the slots might be viewable (as represented by the solid line boxes within the UI 112) while other slots are not viewable (as represented by the dashed line boxes below the UI 112). These invisible slots become viewable when the user scrolls to down the page or resizes the UI 112. In one implementation, when a page is rendered, all slots on the page are deemed to be exposed to the user, whether viewable or not. Thus, individual content components are considered exposed to the user whether or not the user actually views them.

A targeting manager 120 assists in deciding what content to target at the user 102 or a class of users to which the user 102 belongs. More particularly, the targeting manager 120 determines which content components to serve to the user 102 based on many factors, such as historical viewing patterns, associations, user surveys, and so forth. The targeting manager 120 further determines where to place the content components in the various slots 116(1)-116(S) of the page 114. The targeting manager 120 may not actually build the page, but it can designate or suggest where the content components are to be placed.

Once placed, the targeting manager 120 observes user interaction with the page to monitor how well the placement does over time to meet predefined objectives. As more individual content components are exposed to more users, the targeting manager 120 attempts to identify types of users (as characterized by certain attributes) that are likely to act on the content components (e.g., by clicking on the component, viewing the component for a prolonged period, interacting with the content, clicking on promotional and buying item being promoted, etc.). The targeting system 120 splits the users into groups according to the attributes and feeds back this information for improved selection and placement of content components for users who exhibit the same attributes as the groups. User interaction continues to be observed, measured, and used to further differentiate users, thereby providing a continuous closed loop approach to automating the targeting of content to users.

The targeting manager 120 may be implemented as part of the site 106, where it is a set of software components that execute on one or more of the servers 110(1)-110(N). Alternatively, the targeting manager may be implemented separately from the site 106, but interactive with the site to direct content to be placed on the page and to monitor the outcome.

It is further noted that the targeting manager 120 may be used to automate placement of essentially any type of content to be served to the user 102. For instance, the targeting manager may be used to target news items to users. Alternatively, the targeting manager may be used to select and place recommendations that are targeted to the users. In another context, the targeting manager may be employed to suggest photographs, video clips, or entertainment options to users.

For purposes of continuing discussion, however, suppose that the targeting manager 120 is configured to assist in selection and placement of campaigns, such as advertising campaigns designed to interest a consumer in purchasing an item or service and merchandising campaigns crafted to market or commercialize on brands. As illustrated in FIG. 1, the targeting manager 120 maintains a repository of campaigns 122(1), 122(2), ..., 122(C) to be placed on various pages being served to users. In this example, each campaign is defined in a template or format that contains a description of the campaign, the content to be presented (including text and images), any parameters and constraints, and so forth. As one example, the campaign may be defined in an extensible markup language (XML) document having content for the advertisement and associated metadata to describe how that content is to be presented. In the FIG. 1 illustration, example campaigns include a campaign 122(1) for advertising a digital camera, a campaign 122(2) for advertising a teddy bear toy, and a campaign 122(C) for advertising an mp3 player, such as the iPod® digital player from Apple, Inc.

The targeting manager 120 suggests one or more campaigns 122(1)-122(C) for placement in one or more slots 116(1)-116(S) of the page 114 to be rendered on the user computing device 104. The targeting manager maintains, or has access to, information on individual users or groups to which the user belongs. Initially, the targeting manager 120 may or may not know anything about the user. However, over time, the user activity at the individual user level is collected and categorized. For instance, the targeting manager 120 may have data pertaining to the user's viewing patterns, purchase history, survey information provided by the user, demographical data, and behavior characteristics associated with such demographics. As more data is collected, attributes may be developed to characterize users. The targeting manager 120 chooses the campaigns based in part on what it knows about the user.

To illustrate this point, suppose that the targeting manager 120 knows that the user is interested in digital photography based on past viewing patterns. Further, the targeting manager 120 knows that the user has purchased children DVDs in the past. Hence, the targeting manager 120 might suggest selection and placement of campaigns associated with digital photography (e.g., the camera advertisement campaign 122(1)) and child-relevant items (e.g., the teddy bear campaign 122(2)).

Once the campaigns are placed and served, the targeting manager 120 receives user interaction data from the site 106 to observe user behavior and measure performance of the campaigns. For example, the targeting manager 120 might track whether the user clicked on the digital camera campaign 122(1) and what further action was taken following this action. Did the user purchase the camera? Did the user return to the original page? Did the user request different information, such as information on other consumer electronics? Did the user leave the site altogether? In one implementation, the targeting manager 120 is designed to protect user privacy, and hence tracks raw data in association with aggregate groups of users.

The targeting manager 120 constructs a learning data structure 124 that records user interaction with the content components over time. As this user activity is collected, the learning data structure 124 facilitates segmentation of the user population into various groups so that content components may be targeted to various groups in the future. The learning data structure 124 may be implemented in many ways, including as decision trees, neural networks, decision tables, nearest neighbor algorithms, support vector machines, and so forth.

For purposes of continuing discussion, the learning data structure 124 is implemented as decision or segment trees 126(1), ..., 126(P), which are constructed for associated placements of the campaigns 122 in the slots 116. Each of the segment trees 126(1)-126(P) characterizes user activity for a particular placement of a particular campaign. Thus, when a campaign 122 is placed into a slot 116 and exposed for viewing by the user 102, the targeting manager 120 constructs an associated tree 126. There is at least one tree per placement, although in some implementations, there may be more than one tree per placement. As users interact with the campaign placement, information is collected in the segment tree data structure. Over time, discernable patterns emerge that may be used to characterize viewer interaction with the campaign. For example, suppose a segment tree is built for the teddy bear campaign 122(2) and overtime a pattern emerges that suggests users who have purchased baby clothing are more likely to interact with the teddy bear campaign than users who did not purchase baby clothing. Thus, the tree may branch to form two groups of users: those who have purchased baby clothes and those who have not. A more detailed discussion of the construction and use of the segment trees 126(1)-126(P) is provided below with reference to FIGS. 2-6.

The targeting manager 120 implements a closed loop mechanism 128 to learn user behavior and leverage that knowledge into making improved campaign selections and placements. When placements are made, the targeting manager 120 monitors user activity. In one implementation, for example, the targeting manager 120 might track whether a user views a placement and purchases the item being advertised in the placement. In another implementation, the targeting manager might observe user activity for an entire session following some interaction with a placement. For instance, say the user 102 clicks on the advertisement placement of the teddy bear campaign 122(2), but ultimately buys a digital camera. The teddy bear campaign receives some credit for eventually driving a purchase of a digital camera, making the value of the teddy bear campaign increase. This activity is recorded and assimilated by the closed loop mechanism 128 to develop a better understanding of the user and other potential users who can be characterized by the same attributes. For instance, if enough people buy a digital camera after clicking through the teddy bear campaign, perhaps there is some association between digital cameras and teddy bears that might be worth assessing and leveraging in the future. Maybe this is attributable indirectly to the concept that parents interested in teddy bears for their young children may also be interested in digital cameras to capture the tender years.

In this way, the automated targeting manager 120 is able to learn automatically over time how to provide more targeted, and hence more relevant, information to users. In this manner, the system 120 can develop a more sophisticated feel for what content to target for individual users. The targeting manager 120 may ascertain preferences of users and associations of various users that are not readily obvious to people who would otherwise manually select content components for various pages. As with our above example, a connection between teddy bears and cameras may not be readily obvious. But this association is discoverable by the targeting manager because it is able to start with a large audience, such as the universe of all users, and let the actual data dictate the possible associations.

Targeting Manager

Figure 2:
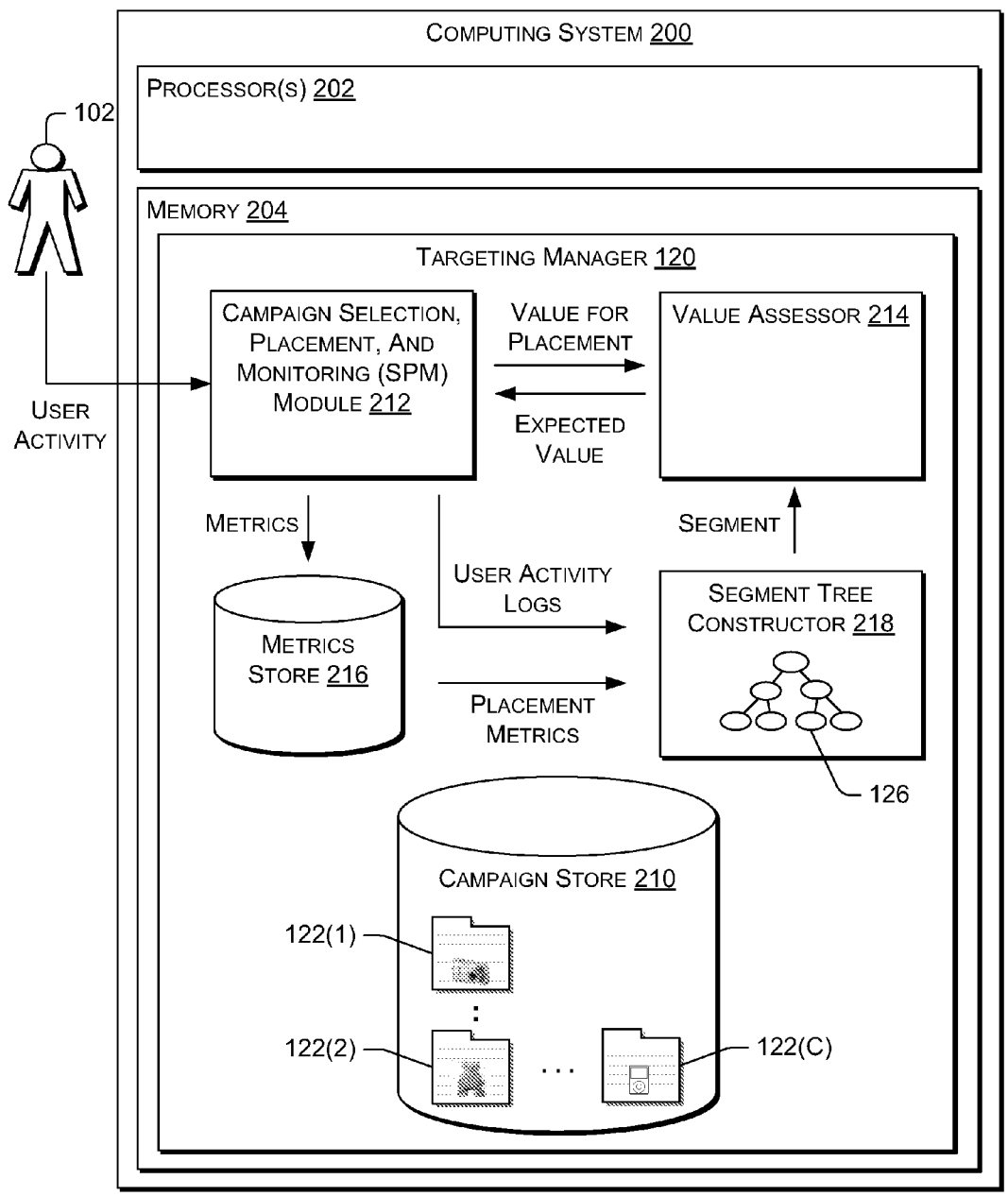
FIG. 2 is a block diagram illustrating selected modules in the targeting manager.

FIG. 2 illustrates on example implementation of the targeting manager 120. Here, the targeting manager 120 is configured as a set of software modules installed on a computing system 200. The computing system may consist of one or more computers, and has processing capabilities and memory suitable to store and execute computer-executable instructions. In this example, the computing system 200 has one or more processors 202 and memory 204. The memory 204 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

The targeting manager 120 is implemented as software or computer-executable instructions stored in a memory 204 and executed by one or more processors 202. The targeting manager 120 may optionally include a campaign store 210 to hold the campaigns 122(1)-122(C). The campaigns specify campaign parameters, the content to be presented, and any other metadata. The campaigns may be defined by human managers, or automated processes, or through a combination of human managers and automated processes. It is noted that the campaign store may be maintained independently of the targeting manager, but the manager has access to the campaigns maintained in the store.

The targeting manager 120 further includes a campaign selection, placement, and monitoring (SPM) module 212 that is responsible for the section and placement of the campaigns 122(1)-122(C) onto pages to be served to a population of users. The SPM manager 212 may choose from any number of campaigns in the campaign store 210, with some being more relevant to the user and context than others. Further, the SPM module 212 may be handling requests for a large population of users and managing hundreds, thousands, or more campaigns simultaneously. Although the SPM module 212 is illustrated in this implementation as a single software module for implementing the functions of selection, placement, and monitoring, it is noted that these functions may be performed by any number of modules, or even by separate computing systems.

When a user 102 visits a site, the campaign SPM module 212 accesses any information pertaining to this particular user. Such information may include activity data accumulated in association with particular contexts. Examples of such information include browsing history, purchase history, behavior patterns, survey information, account information, and so forth. This information helps determine whether the user can be characterized in any way to help in selecting targeted campaigns. The campaign SPM module 212 may also ask a value assessor 214 to provide a value to the piece of content relative to being viewed by this particular user. This value may be based on many factors particular to the user or the group to which he/she belongs. For instance, in the example of an e-commerce site, value may be impacted by how frequently the user visits, the number of purchases made, the amount of purchases, the types of purchase, purchase trends, and so on. The value assessor 214 returns a value that a placement is expected to yield for this user. The value may be expressed in terms of dollars or some other measure.

Based on the value and any known attributes of the user, the campaign SPM module 212 selects campaigns from the campaign store 210 for placement in pages to be served to the user 102. As the pages are served and the campaigns exposed to the user, the SPM module 212 monitors user activity in response to exposure to the campaigns. The module 212 may directly track click activity or other metrics, or receive this data from the site 106.

In one possible implementation, aspects of the campaign SPM module 212 can be implemented as described in U.S. patent application Ser. No. 10/393,505, entitled "Adaptive Learning Methods for Selecting Web Page Components for Inclusion in Web Pages", which was filed Mar. 19, 2003.

The campaign SPM module 212 stores the user activity metrics in a metrics store 216. Additionally, the campaign SPM module 212 forwards logs of user activity to a segment tree constructor 218. The user activity logs contain information pertaining to campaign placements, including such data as which slots the campaigns were placed in, the number of exposures of the campaign, any click actions on the placed campaign once exposed, whether any downstream purchases were made, and the like. Additionally, the user activity logs may include viewing data about what pages the user viewed, how long the user viewed the pages, and so on. This viewing data may be used to help characterize users according to a set of attributes. In the context of an e-commerce environment, for example, long term attributes may be established based on products and services purchased by users (e.g., digital cameras, DVDs, etc.) while short term attributes may be the items being viewed by the user and any trends in viewing behavior.

The segment tree constructor 218 builds the segment trees 126 based on the user activity metrics received in the logs from the SPM module 212. The segment trees are constructed over time as a way to learn and record which user attributes are predictive of user engagement with the campaigns. In the described implementation, the segment tree constructor 218 builds one segment tree for each placement of a campaign that is suggested by the campaign SPM module 212.

Each segment tree 126 has one or more nodes. Each node is representative of an attribute used to characterize the population of users. The tree therefore differentiates among groups of users according to the attributes represented by the nodes. The tree constructor 218 employs the user activity metrics to identify key attributes and makes branching decisions upon discovery of a key attribute that is predictive of user activity.

When the tree constructor 218 decides to segment the tree, the new segment is passed to a value assessor 214 for use in deriving more accurate values. In turn, the values are passed to the campaign SPM module 212 to enable more granular targeting of campaigns to users in the new segment. In this manner, the targeting manager 120 implements a closed loop mechanism in which the SPM module 212 places campaigns for users based on an assessed value supplied by the value assessor 214. User activity is monitored as users become exposed to the campaign and fed to the segment tree constructor 218 to construct segment trees that attempt to learn which user attributes have the most impact on user interaction with the campaign. As key attributes become ascertainable, the segment tree constructor 218 segments the users along the key attributes and feeds these segments to the value assessor 214. In response, the value assessor 214 adjusts the values given to the SPM module 212 for users meeting a specific set of attributes. This has an effect on which campaigns are selected and exposed to the users. User activity is further monitored and fed back to the segment tree constructor. As this closed loop feedback continues, the targeting manager 120 is able to target campaigns to increasingly refined sets of users.

Tree Construction

FIGS. 3-6 show construction of a segment tree 126. For purposes of discussion and illustration, tree construction will be described in the context of placing advertisements on web pages served by an e-commerce website. The advertising campaign is a 10% discount on the purchase of an mp3 player, such as an iPod® digital player from Apple, Inc. The e-commerce website has records or logs of past purchases made by the users.

Figure 3:
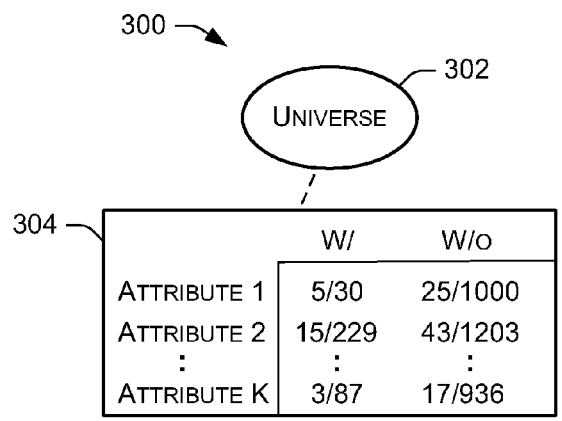
FIG. 3 illustrates an initial point in construction of a segment tree, which is used by the targeting manager.

FIG. 3 shows a segment tree 300 at its infancy, following placement of a campaign into a slot on a page. A root node 302 is created to define the group of users that forms the observable universe. The universe may be all users or a subset of users, such as users who meet predefined criteria (e.g., demographic, behavior characteristic, historical shopping patterns, etc.). In certain implementations, the universe may be a parameter that is set by the campaign designer so that the campaign stipulates the desired universe. For example, a designer may wish to target a universe of all users who have purchased a DVD in the past. In other implementations, the universe may simply default to all users or a subset of users. In our example, suppose that the campaign 122(C) calls for a universe of all users, and when placed onto a location on the page, the segment tree constructor 218 creates a root node 302 for a universe of all users.

Associated with the root universe node 302 is a feature count table 304 to track user activity. The feature count table 304 contains a predefined list of features or attributes against which to measure user activity. There may be any number of attributes in the feature count table. The attributes are definable by system operators or campaign managers for a given context. Within our ongoing example of an advertisement placement, the attributes might relate to other products or services that may be of interest to, or purchased by, users in the universe in the past. For instance, in the context of placing an advertisement for an electronic mp3 player, the attributes might include products such as DVDs, digital cameras, game systems, computers, electronic magazines, fictional books, cellular phones, running equipment, and so on. In FIG. 3, the feature count table 304 has attributes 1-K.

When the advertising campaign is exposed, user activity is tracked in the feature count table 304. In one implementation, click actions taken by the user during a session following campaign exposure are tracked. A simple count of the clicks provides a satisfactory proxy of user activity. It is noted, however, that as an alternative to click counts other metrics may be employed, such as viewing duration, click rate or frequency, downstream purchase, and so forth.

To illustrate, suppose a user is exposed to a page on the e-commerce site, and the page contains the mp3 advertisement campaign. The e-commerce site has records of the user's purchase history, which reveals that the user has previously purchased a DVD and a gaming system. Now, if the user clicks on the mp3 campaign, counts are added in the table 304 for the attributes related to DVDs and game systems.

The counts are recorded in the feature count table 304. In the illustrated example, the count table 304 has at least two columns: a first column (i.e., the "w/" column) for users who are characterized by the associated attribute and a second column (i.e., the "w/o" column) for users who are not characterized by the associated attribute. Each count is recorded in a format X/Y, where the value X represents the number of clicks on the campaign and the value Y represents the total number of users in that column who have been exposed to the campaign. It is noted that other table structures and designs may be used to record count information or other metrics employed to value the performance of a placed campaign.

Initially, the counts are 0/0. Now, assume that the campaign is exposed to a first user who has previously purchased a DVD (e.g., attribute 1). The user decides not to click on the 10% discount campaign for the mp3 player. In this case, the Y count is incremented by one (i.e., 0/1). Later, suppose the campaign is exposed to anther user who has previously purchased a DVD. This user decides to click on the campaign for an mp3 player. As a result, both the X and Y counts are incremented by one (i.e., 1/2). This continues for a predetermined duration or until a count number reached.

In FIG. 3, the count values for attribute 1 reveal that the advertisement campaign was exposed to 30 users who can be characterized by that attribute (e.g., those who have previously purchased a DVD). Of those 30 users, five users clicked on the advertisement campaign. This is a relatively effective click through metric, in that one in six users (or 16.7%) with this attribute clicked on the advertisement. In contrast, the advertisement campaign was exposed to 1000 users who are not characterized by attribute 1 (e.g., those who have not previously purchased a DVD), and of those 1000 users, only 25 users clicked on the campaign. This is a comparatively less effective click metric, in that only one in forty users (or 2.5%) without attribute 1 acted on the advertisement. For attribute 2, the count values indicate that the campaign was exposed to 229 users who exhibit or satisfy attribute 2 (e.g., those who have previously purchased a computer), and only 15 users in that group clicked on the advertisement campaign. However, 43 out of 1203 users who do not possess attribute 2 (e.g., those who have not previously purchased a computer) clicked on the campaign.

Over time, patterns emerge in the feature count table 304 which suggest that the population of users may be segmented or split along one or more attributes so that the advertisement campaign may be more precisely targeted to a smaller segment of the population. The segment tree constructor 218 determines whether there is enough data for one or more attributes to be valid. In one implementation, a threshold exposure count is used to indicate whether the campaign has been exposed to a sufficient number of users who exhibit a particular attribute to be valid. The threshold exposure count is a definable parameter that is set by the system operator or campaign manager.

When there is one or more valid attributes, the segment tree constructor 218 decides whether to split the users into two segments along the attribute that proves the most effective at driving traffic to the advertisement campaign. In one approach, the segment tree constructor 218 uses conversions (i.e., a click on the campaign following exposure) as a measure of which attribute had the greatest impact. The constructor 218 looks through all the attributes on the feature count table 304 in search for the largest differential between conversions in the two columns. Here, for example, attribute 1 may be found to have the largest separation between conversions (i.e., 16.7% for users characterized by the attribute v. 2.5% for users not characterized by the attribute) and thus, a decision is made to split along attribute 1. The segment tree constructor 218 creates two nodes that are subordinate to the root node 302, where one node represents the segment of users to which attribute 1 applies, and the second node represents the remaining users.

It is noted that conventional decision tree splitting algorithms may also be employed to determine when a tree is ready to be split along a key attribute. Examples of well-known decision tree splitting algorithms include the gini index (GI), ID3 algorithm, and C4.5 or C5.0 algorithms. It is further noted that decision of whether to split is time sensitive, depending on the content being placed. For advertisements, a placement may only run for a few days to few weeks. For news or weather items, a placement may run for only a few hours to a few days. For financial information, a placement may run for a few minutes to a few hours.

Figure 4:
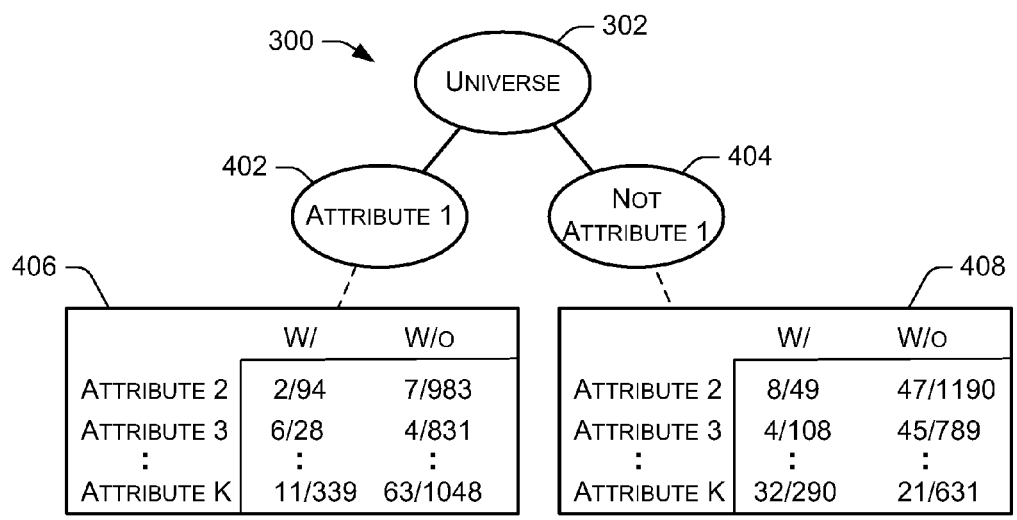
FIG. 4 illustrates another point in construction of the segment tree, subsequent to the point in FIG. 3.

FIG. 4 shows the segment tree 300 after the first split. Two children nodes 402 and 404 branch from root node 302. The first child node 402 represents the segment of users to which attribute 1 applies, and the second child node 404 represents the remaining users. New feature count tables 406 and 408 are created for respective child nodes 402 and 404 to track user activity. Each feature count table 406 and 408 contains the list of attributes, with the exception of the attribute along which the population was split.

Once again, user activity in the form of click counts are recorded in the feature count tables 406 and 408 as the campaign is exposed to the various user segments. Over time, patterns emerge in the feature count tables which tend to suggest that the users within the segments may be further split along one or more additional attributes. In FIG. 4 for example, attribute 3 appears to be the most predictive measure of whether users within the segment of users who have purchased a DVD (i.e., attribute 1) are more likely to click on the discount advertisement for an mp3 player. Suppose attribute 3 pertains to whether a user has previously purchased an electronic gaming system. The data in feature count table 406 reveals that users who have purchased a gaming system exhibit the highest click counts and hence a decision may be made to split along attribute 3.

Figure 5:
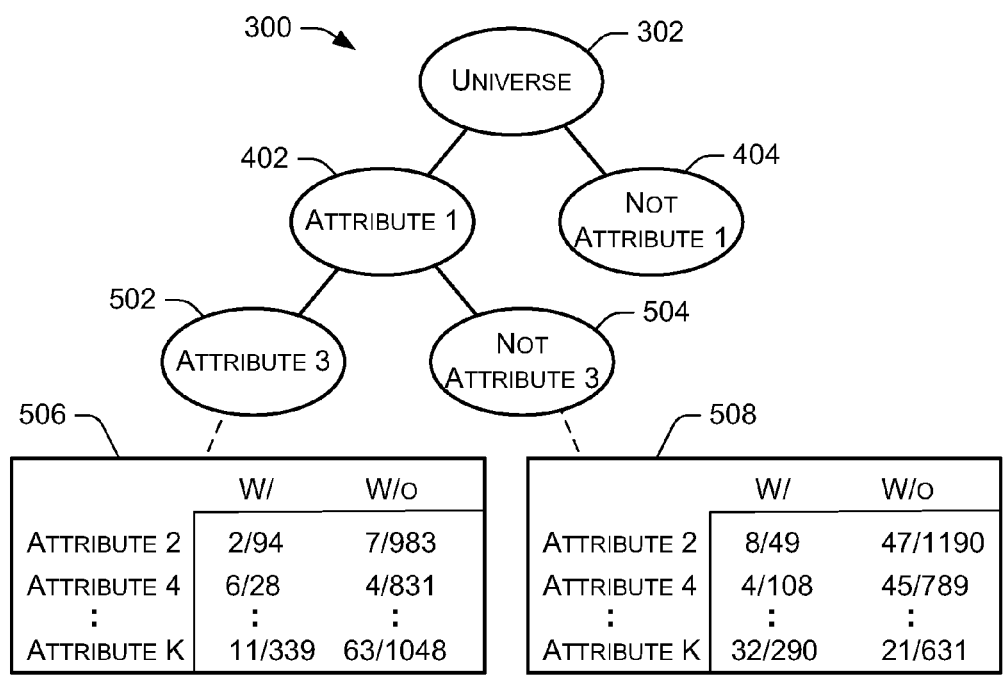
FIG. 5 illustrates yet another point in construction of the segment tree, subsequent to the point in FIG. 4.

FIG. 5 shows the segment tree 300 after splitting the users who can be characterized by attribute 1 into two smaller groups. Two more nodes 502 and 504 are added to the tree 300, branching from the parent node 402. The first new node 502 represents the segment of users to which attribute 3 applies, and the second new node 504 represents the remaining users in the segment defined by parent node 402. New feature count tables 506 and 508 are created for respective nodes 502 and 504 to track user activity. Each feature count table 506 and 508 contains the list of attributes, with the exception of the attributes 1 and 3 along which the population has been split. As above, user activity in the form of click counts are recorded in the feature count tables 506 and 508 as the campaign is exposed to the various user segments. Over time, patterns emerge in the feature count tables which tend to suggest that the users within the segments may be further split along one or more additional attributes.

Figure 6:
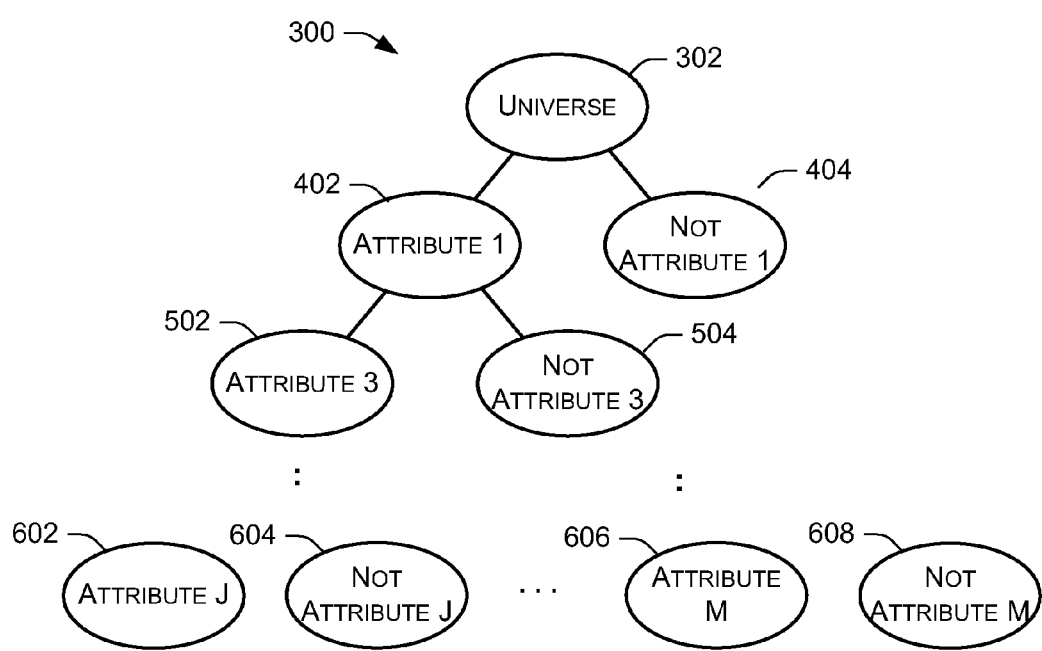
FIG. 6 illustrates an example of a fully constructed segment tree.

FIG. 6 shows a mature segment tree 300 after many splits. More nodes are formed, ultimately ending with leaf nodes, which are represented as nodes 602, 604, 606, and 608. There is no limit to the number of nodes or node levels in the tree 300. However, in one implementation, the segment tree constructor builds trees with five levels and the possibility of 32 nodes or user segments. The segment tree 300 is maintained by the segment tree constructor in association with each campaign and/or placement of the campaign. The segment trees may then be used going forward to better target the campaigns to particular users who exhibit a specific set of attributes. For instance, in our continuing example, the segment tree for an advertisement campaign on an mp3 player may suggest that the best users to target are those who have purchased a DVD, a gaming system, and exercise equipment, but have not purchased a cellular phone or a baby clothing. Thus, when a user fitting those attributes next accesses the site, the targeting manager 120 will select and place the mp3 advertisement campaign in a slot for exposure to that user.

It is noted that one assumption made throughout this discussion is that user behavior is roughly the same over the observation period. Over prolonged periods, behavior may change. To account for this behavior shift, new segment trees may be grown at different times. Old trees may be kept or discarded. Further, if trees are deemed too stale and no longer represent reasonable segments of the users, the system may simply prune certain nodes from the tree or rebuild an entirely new tree.

Operation

Figure 7:
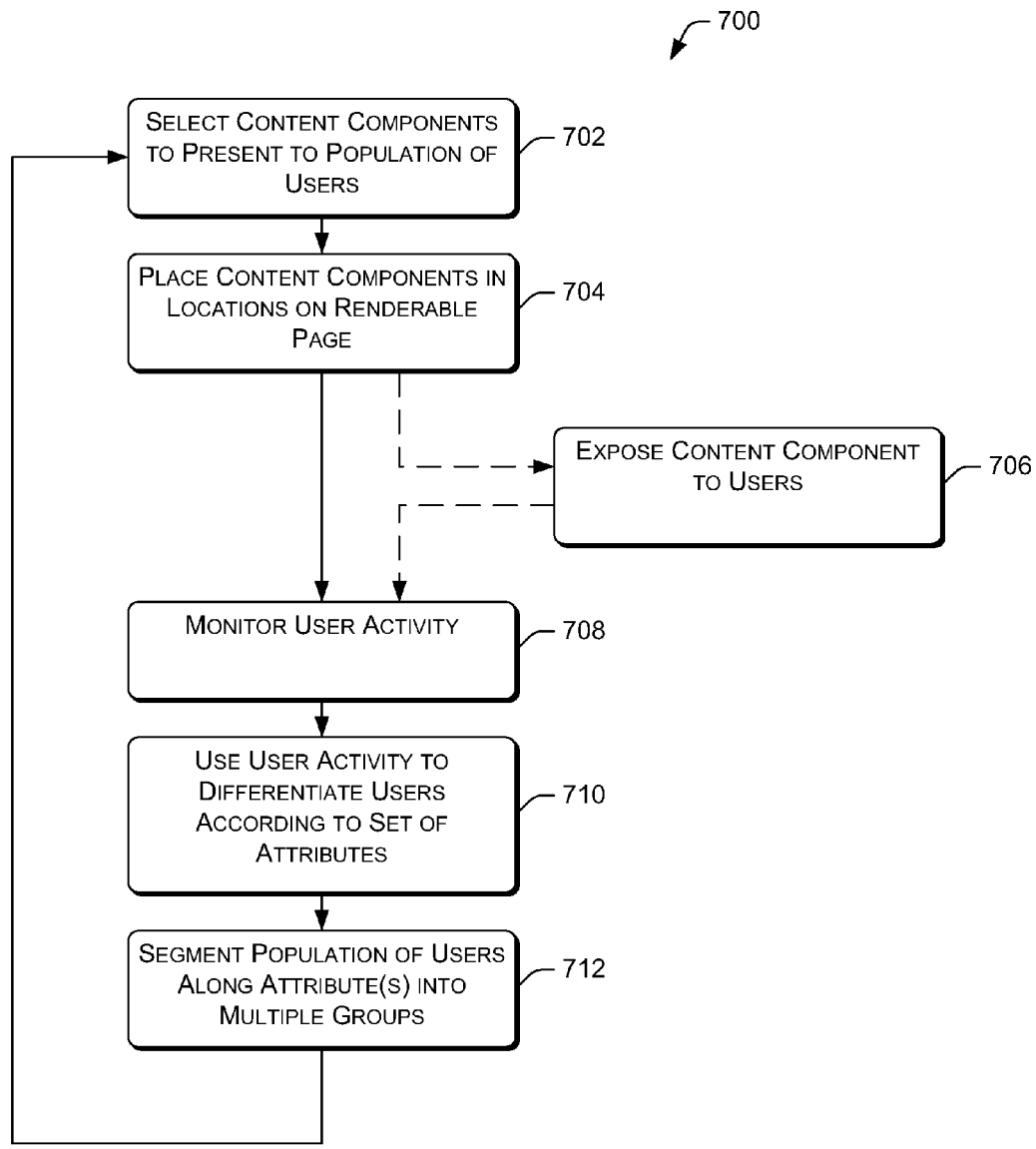
FIG. 7 is a flow diagram of a process for automated targeting of content to users.

FIG. 7 illustrates an example process for automated targeting of content to online users. The process is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the process is described with reference to the architecture 100 of FIG. 1 and the computing system 200 of FIG. 2. In particular, many acts described below may be implemented and performed by the targeting manager 120 shown in FIGS. 1 and 2.

FIG. 7 shows a process 700 for automated targeting of content components to one or more segments of users. At 702, content components are selected for presentation to a population of users. This selection may be based on any number of factors. In one implementation, the content components are selected based on the activity data accumulated over time by observing user behavior in association with a context. In an e-commerce context, the selection of components may be based, for example, on browsing history or purchase history. In the implementation described above with reference to FIG. 2, the campaign selection, placement, and monitoring module 212 performs operation 702. The campaign SPM module 212 selects campaigns from the campaign store 210 based in part on an expected monetary value that campaigns are expected to yield for a given user, which is driven in part based on an understanding of whether the user fits one or more attributes.

At 704, the selected content components are placed for presentation to the users. As illustrated in the network server architecture of FIG. 1, the content components may be placed in any number of slots on pages that can be rendered by a browser for presentation to the user. Placement of content in these slots is also based, in part, on whether the expected value supports placement in higher profile slots or lower profile slots. Generally, slots 116(1)-116(S) have different costs. Higher profile slots, such as central slots that are immediately viewable (e.g., slot 116(1)) have a higher associated cost while other lower profile slots, such as side slots that are not immediately viewable (e.g., side slot 116(S)) have a lower associated cost. With reference again to FIG. 2, operation 704 may be performed by the campaign SPM module 212, which directs placement of the campaigns in particular slots based in part on the expected value that the campaigns are expected to yield for a given user.

At 706, the content components are exposed to the population of users. This operation may be performed by the same entity or system that performs the other operations, or by an independent entity (as represented visually in FIG. 7 being out of line with the other operations). In the FIG. 1 environment, for example, the site 106 exposes the content components by serving pages to the user computing device 104. In some cases, this site 106 represents a website that is independent of the targeting manager 120 in terms of being operated by another entity. However, in other cases, the targeting manager 120 may be implemented by the site operator and hence the same entity is performing all operations in FIG. 7.

At 708, user activity following exposure to the content components is monitored. There are many ways to implement this monitoring. In one implementation, direct user interaction with each of the content components is recorded, such as by counting clicks on the content components. In other implementations, other metrics may be tracked, such as measuring click-through frequency, measuring click-through trends, tracking page views, measuring duration of page views, measuring session duration, downstream purchase, and other interactions.

At 710, the user activity metrics are employed to differentiate users according to a set of attributes. That is, based on this user activity, operation 710 ascertains one or more key attributes that are predictive of how users will respond to the content components. Identification of such key attributes may be accomplished in many ways. In one approach, attributes that correlate to the highest number of affirmative actions taken by the users on the content component are identified as being key predictors. In another approach, key attributes are uncovered based on statistical analysis of the click activity of the users. Consider the example illustrated in FIG. 3, where the targeting manager counted the number of exposures and clicks on the placed campaign across all user attributes. Key attributes were found to be those attributes with the largest difference between conversions (i.e., users who clicked on the campaign following exposure) of users who exhibit the attribute and conversions of users who do not exhibit the attribute.

It is noted that the attributes may be predefined or observable over time. In the example e-commerce scenario above, the attributes are based on a user's purchase history, such as whether a user had purchased a DVD or a gaming system. However, the attributes may be defined in other ways, such as user demographics, user browse history, and so on.

At 712, the users are segmented into multiple groups according to the key attributes. Segmentation creates different, smaller groups of users to whom content components may be targeted more granularly. In one implementation, segmentation is implemented by building a decision tree structure for individual placements of the content component. The decision tree has a root node representing a universe of users being observed and one or more subordinate nodes representing the attributes along which groups of users are segmented. These trees may then be saved in association with the content components and used to better target the content components to users who meet the set of key attributes defined by the tree.

As more user segments are created along various attribute boundaries, these segments are fed back for use in selecting and placing content components. This is represented by the feedback loop to 702. Thus, when a new user arrives at the site, the user can be evaluated to see which attributes best characterize him or her, and based on that, select and place content components having segment trees that suggest the components might appeal to the user.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media comprising computer-executable instructions that, when executed on one or more processors, perform a method for automated targeting of content components to a population of users, the method comprising:

selecting a content component to expose for viewing by the population of users, the population of users being characterized by a set of items purchased by the population of users;

placing the content component in a particular location on a page to be rendered electronically;

monitoring activity of the population of users in response to exposure of the content component to the population of users;

differentiating among the population of users based on one or more items in the set of items with respect to the content component, wherein the differentiating comprises determining which items in the one or more items are predictive of increased user activity with respect to the content component, the determining comprising:

finding, among the set of items, an item correlated to a largest difference between:

values of a ratio of counts of a number of exposures and counts of a number of click actions of users among the population of users who have previously purchased the one or more items in the set of items; and values of a ratio of counts of a number of exposures and counts of a number of click actions of users among the population of users who have not previously purchased the one or more items in the set of items; and segmenting the population of users into multiple groups of users based on the item found to be correlated to the largest difference.

2. The one or more non-transitory computer-readable media as recited in claim 1, wherein the content component is selected from a group of content components comprising advertisements, news, search results, weather, articles, entertainment, financial data, traffic information, recommendations, images, photographs, video, and e-commerce items.

3. The one or more non-transitory computer-readable media as recited in claim 1, wherein the monitoring of activity of the population of users comprises tracking exposures of the content component and user interaction with the content component.

4. The one or more non-transitory computer-readable media as recited in claim 1, wherein the monitoring of activity of the population of users comprises compiling counts of a number of exposures of the content component to the population of users and a number of affirmative actions taken by the users on the content component.

5. The one or more non-transitory computer-readable media as recited in claim 1, wherein the differentiating comprises determining which item purchased by the users in the set of items purchased by the users is correlated to a highest number of affirmative actions taken by the users on the content component.

6. The one or more non-transitory computer-readable media as recited in claim 1, wherein the segmenting comprises building a tree structure for individual placements of the content component, the tree structure having a root node representing a universe of users being observed and one or more subordinate nodes representing the items in the one or more items along which groups of users are segmented.

7. The one or more non-transitory computer-readable media as recited in claim 1, wherein the segmenting comprises:

segmenting the population of users into a first group of users who have purchased the item found to be correlated to the largest difference and a second group of users who have not purchased the item found to be correlated to the largest difference;

differentiating, a second time, among the first group of users based on the one or more items in the set of items purchased by the users, with the exception of the item found to be correlated to the largest difference along which the population was segmented; and segmenting, a second time, the first group of users who have purchased the item found to be correlated to the largest difference.

8. One or more non-transitory computer-readable media comprising computer-executable instructions that, when executed on one or more processors, perform a method comprising:

monitoring, within a population of users, user activity when content components are exposed for viewing;

identifying, based on the user activity, one or more key items from a set of items that characterize the population of users, wherein the identifying of the key items comprises:

compiling counts, for each item in the set of items, of exposures and click actions taken by individual users on the content components;

associating the counts with one or more items in the set of items based at least in part on whether the one or more items in the set of items were previously purchased by one or more users of the population of users or whether the one or more items in the set of items were not previously purchased by one or more users of the population users; and finding the one or more key items by finding a largest difference between;

values of a ratio of the counts associated with the one or more items in the set of items previously purchased by the one or more users of the population of users; and values of a ratio of the counts associated with the one or more items in the set of items not previously purchased by the one or more users of the population of users;

segmenting the population of users into multiple groups based on the one or more key items, wherein the segmenting comprises building binary trees for associated content components, the binary trees having:

(i) a root node that defines a universe of users and that is associated with a feature count table, the feature count table containing:

the values of the ratio of the counts associated with the one or more items in the set of items previously purchased by the one or more users of the population of users; and the values of the ratio of the counts associated with the one or more items in the set of items not previously purchased by the one or more users of the population of users, and (ii) children nodes that differentiate segments of the population of users comprising users who have purchased the key items and users who have not purchased the key items; and targeting different content components to the groups of users.

9. The one or more non-transitory computer-readable media as recited in claim 8, wherein the content components comprise advertising campaigns exposed on renderable pages.

10. The one or more non-transitory computer-readable media as recited in claim 8, wherein the content components comprise merchandising campaigns exposed on renderable pages.

11. The one or more non-transitory computer-readable media as recited in claim 8, wherein the monitoring comprises tracking click actions taken by the users after being exposed to the content components.

12. The one or more non-transitory computer-readable media as recited in claim 8, wherein the targeting comprises selecting different content components to expose to the groups of users.

13. The one or more non-transitory computer-readable media as recited in claim 8, wherein the targeting comprises arranging the content components in different locations for exposure to the groups of users.

14. One or more non-transitory computer-readable media comprising computer-executable instructions that, when executed on one or more processors, perform a method comprising:
   tracking user activity with respect to a content component comprising an actionable component that a user can click on when the content component is exposed for viewing by a population of users;
   assessing the user activity across a set of items that are descriptive of the population of users to identify one or more key items that are predictive of whether the users will act on the content component, the assessing to identify the one or more key items comprising:
      compiling counts, for each item in the set of items, of exposures of the content component and counts of user clicks on the content component;
      associating the counts of exposures and the counts of user clicks with one or more items in the set of items based at least in part on whether the one or more items in the set of items were previously purchased by one or more users of the population of users or whether the one or more items in the set of items were not previously purchased by one or more users of the population users; and
      finding the one or more key items by finding a largest difference between;
         values of a ratio of the counts of exposures and the counts of user clicks associated with the one or more items in the set of items previously purchased by the one or more users of the population of users; and
         values of a ratio of the counts of exposures and the counts of user clicks associated with the one or more items in the set of items not previously purchased by the one or more users of the population of users; and
   building a learning data structure that represents a universe of users to which the content component is exposed and differentiates groups of users by the one or more key items, wherein the building comprises:
      constructing a decision tree structure that is associated with the content component, the decision tree structure having:
      (i) a root node that represents the universe of users to which the content component is exposed and that is associated with a feature count table, the feature count table containing:
         the values of the ratio of the counts associated with the one or more items in the set of items previously purchased by the one or more users of the population of users; and
         the values of the ratio of the counts associated with the one or more items in the set of items not previously purchased by the one or more users of the population of users to measure the user activity, and
      (ii) subordinate nodes that represent segments of the universe of users comprising users who have purchased the one or more key items and users who have not purchased the one or more key items.

15. A targeting manager for automated targeting of content components to a population of users, the targeting manager being stored on one or more non-transitory computer-readable media and comprising computer-executable instructions that, when executed on one or more processors, perform acts comprising:
   monitoring user activity when a content component is placed in a particular location of a page and exposed for viewing;
   identifying one or more items, from a set of predefined items used to characterize the users, that are predictive of user activity with the content component, wherein the identifying of the one or more items comprises:
      compiling counts, for each item of the set of items, of (1) a number of exposures of the content component and a number of click actions on the content component made by users who have purchased the item and (2) a number of exposures of the content component and a number of click actions on the content component made by users who have not purchased the item;
      finding, for each item of the set of items, a difference between;
         a value of a ratio of the counts of the number of exposures of the content component and the number of click actions on the content component made by the users who have purchased an item of the set of items; and
         a value of a ratio of the counts of the number of exposures of the content component and the number of click actions on the content component made by the users who have not purchased the item of the set of items;
      finding the one or more items associated with a largest difference among the differences associated with the set of items;
   using the one or more items to differentiate the population of users into groups; and
   selecting and placing different content components to different groups of users.

16. The targeting manager as recited in claim 15, wherein the monitoring comprises at least one of counting clicks on the content components, measuring click-through frequency, measuring click-through trends, tracking page views, measuring duration of page views, or measuring session duration.

17. The targeting manager as recited in claim 15, further comprising computer-executable instructions that, when executed on one or more processors, perform acts comprising constructing a tree structure that is associated with the placement of the content component, the tree structure having a root node that defines a universe of users and one or more subordinate nodes that segment the users into multiple groups according to the one or more items.

18. A server system comprising:
   one or more processors;
   a non-transitory memory, accessible by the one or more processors;

a targeting manager stored in the memory and executable on the one or more processors to select and place content components on pages to be electronically rendered to a population of users; and wherein the targeting manager monitors user activity when the content components are exposed, learns which items purchased by the population of users are predictive of user interest in the content components, and adjusts selection and placement of the content components to target different groups of users segmented by the items purchased by the population of users, the targeting manager comprising:

a segment tree constructor to build tree structures for associated placements of content components, the tree structures having a root node that represents a universe of users to which the content components are exposed and subordinate nodes that represent different groups of users who are differentiated by the items purchased by the population of users, wherein the differentiating comprises:

finding, among the items purchased by the population of users, items correlated to a largest difference between;

values of a ratio of counts of a number of exposures and counts of a number of click actions of users who have purchased items among the items purchased by the population of users; and values of a ratio of counts of a number of exposures and counts of a number of click actions of users who have not purchased the items among the items purchased by the population of users.

19. The server system as recited in claim 18, wherein the content components are selected from a group of content components comprising advertisements, news, search results, weather, articles, entertainment, financial data, traffic information, recommendations, images, photographs, video, or e-commerce items.

20. The server system as recited in claim 18, further comprising a store to hold the content components.

\* \* \* \* \*